United States Patent Office 3,050,339
Patented Aug. 21, 1962

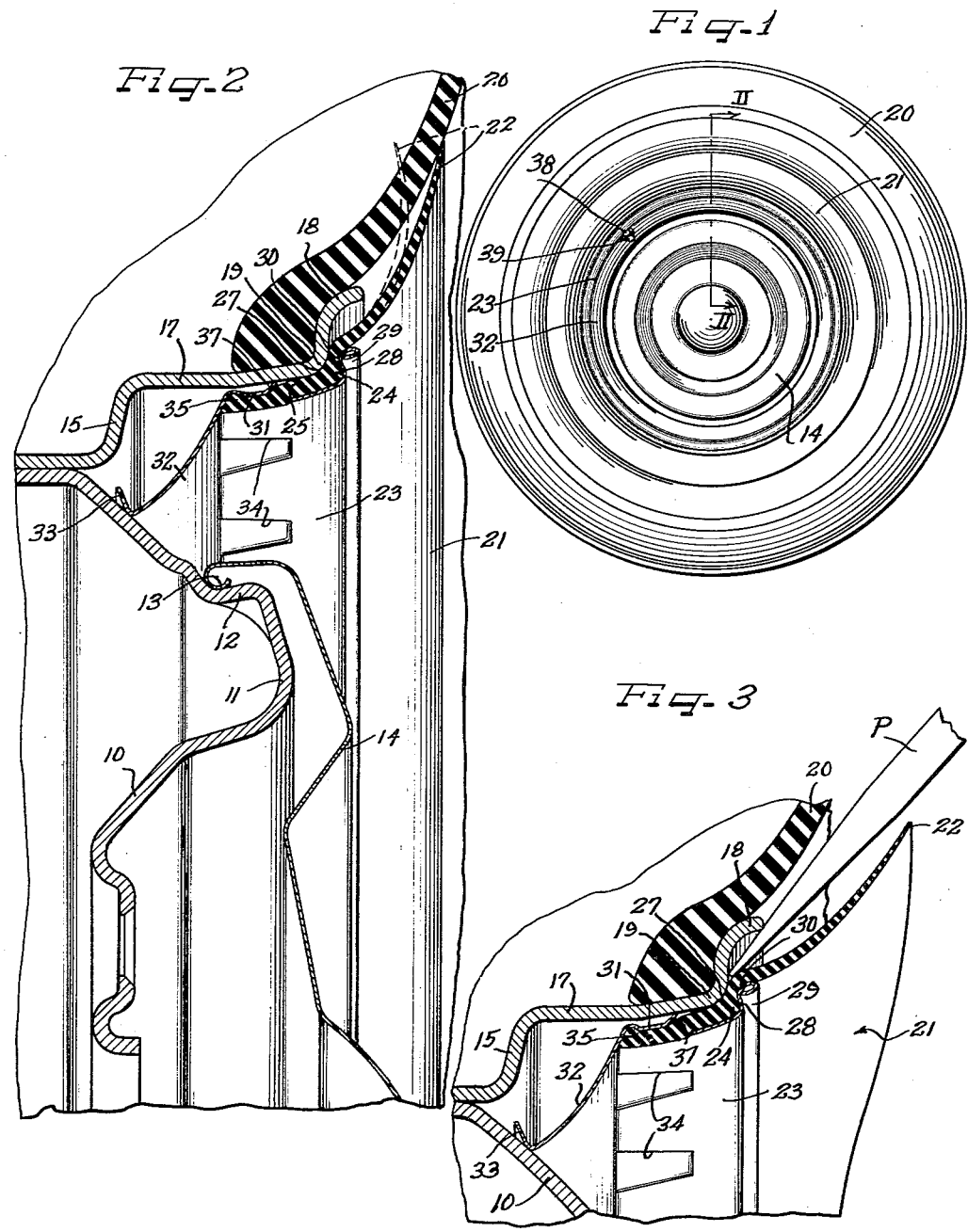

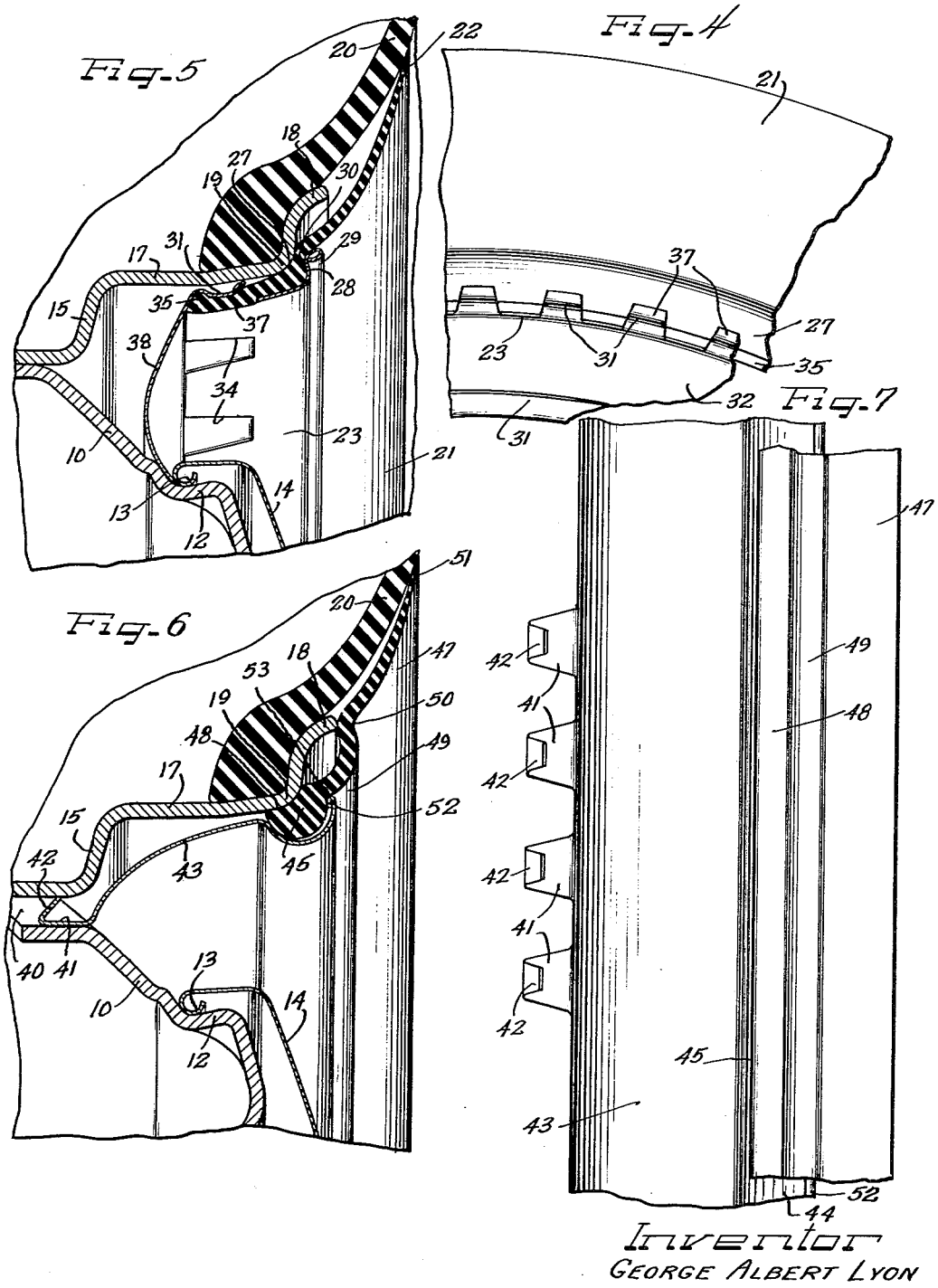

3,050,339
WHEEL COVER
George Albert Lyon, Detroit, Mich., assignor to Lyon Incorporated, Detroit, Mich., a corporation of Delaware
Filed Sept. 11, 1957, Ser. No. 683,287
8 Claims. (Cl. 301—37)

The present invention relates to improvements in wheel structures and more particularly concerns the provision of novel means for providing a wheel with a simulated white sidewall for a tire on the wheel.

For ornamental purposes, automobile tires are commonly provided with white sidewalls, the remainder of the tire being of a more or less black appearance. The white rubber used for the white sidewall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white sidewalls, generally resulting in a sacrifice of quality in the body of the tire including the tread and principal sidewall portions thereof.

To overcome the disadvantages of cure compromise, it has been proposed to secure the white sidewall portion or veneer to the sidewall of the tire after the tire has been vulcanized. Such after-attached sidewall members are inherently liable to such disadvantages as peeling, and the like, and of course require a separate attaching or vulcanizing operation that raises costs.

It has also been heretofore proposed to provide separate simulated white sidewall ring members that are secured between the terminal flange of the tire rim and the bead portion of the tire and separably hug the sidewall of the tire. Such simulated or mock tire white sidewall rings require, of course, that the tire be deflated in order to install the ring members. Should such simulated white sidewall rings become damaged, it is necessary to deflate the tire not only to remove the damaged ring but also to replace the ring. Furthermore, a disadvantage of such simulated white sidewall rings is that, especially with tubeless tires there is interference with proper sealing, gripping engagement of the tire bead portion with the opposing surfaces of the tire rim and more particularly the terminal flange between which and the tire bead the simulated white sidewall ring is clampingly interposed.

It is accordingly an important object of the present invention to overcome the foregoing difficulties and disadvantages of the prior expedients and to provide a simulated tire white sidewall of improved appearance and which can be applied, or removed, or replaced without disturbing the tire.

Another object of the invention is to provide an improved tire sidewall simulating member which serves also as means for covering the tire rim terminal flange as well as wheel balancing weights that may be carried by such flange.

A further object of the invention is to provide a novel tire sidewall simulating ring member which is adapted for optional assembly with a wheel cover for disposition over the outer side of the wheel.

Yet another object of the invention is to provide a tire sidewall simulating flexible ring device which is adapted to be carried in clamped engagement with the outer side of a tire rim.

It is a further object of the invention to provide cushioning means for a wheel cover, also adapted for providing a simulated tire sidewall.

Other objects, features and advantages of the present invention will be readily apparent from the following detailed description of certain preferred embodiments thereof, taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a sectional view similar to FIGURE 2 but showing the manner in which a pry-off tool may be applied to remove the ring assembly from the wheel;

FIGURE 4 is a fragmentary rear elevational view of the ring assembly of FIGURE 2;

FIGURE 5 is a radial sectional detail view similar to FIGURE 2 but showing a modification;

FIGURE 6 is a radial sectional detail view through a wheel structure showing a further modification; and FIGURE 7 is a fragmentary side or edge elevational view of the ring assembly of FIGURE 6.

Having reference to FIGURES 1, 2 and 3, a wheel structure is shown including a wheel body 10 including an intermediate annular nose bulge 11 on the radially outer side of which may be provided a plurality of circumferentially spaced generally radially outwardly projecting hub cap retaining bumps or projections 12 over which a marginal retaining bead 13 of a hub cap 14 is adapted to be snapped to retain the hub cap over the central portion of the wheel.

At its outer margin the wheel body 10 is attached to and supports a tire rim having an outer side flange 15 leading to a generally axially outwardly extending intermediate flange 17 that merges with a terminal flange 18 on a generally radially inwardly and axially outwardly projecting annular shoulder juncture 19. A pneumatic tire 20 of the tubeless type is adapted to be supported by the tire rim.

In order to afford the ornamental appearance of the tire sidewall extending to a greater extent radially inwardly than normally permitted in view of the overlap of the terminal flange 18 with the bead portion of the tire, and in order to afford, where desired, a white sidewall appearance for the tire, or the appearance of the sidewall of the tire having any other preferred decorative color, a tire sidewall simulating ring extension member 21 in the form of a ring of rubber-like material such as synthetic butyl rubber is provided of a diameter to extend from overlapping relation to the tire sidewall radially outwardly beyond the tip of the tire rim terminal flange 18 and of an inner diametrical extent to overlie the terminal flange. By preference, the rubber-like sidewall ring member 21 is of generally concave convex shape more or less complementary to the axially outwardly bulging arcuate shape of the tire sidewall, and of a body structure thickest at its radially inner margin and tapering toward a radially outer feather edge tip 22 which is engageable in hugging self-positioning tensioned relation with the tire sidewall and is adapted to follow flexibly changes in shape or movements of the tire sidewall. This feature is enhanced by having the ring member 21 constructed normally to assume a more axially inward position as indicated in dash outline in FIGURE 2 so that when the ring member is applied to the outer side of the wheel, it is caused to be substantially flexed from the dash outline condition to the full outline condition shown to thus maintain the ring member resiliently thrust at its edge 22 against the tire rim sidewall.

At its radially inner margin, the ring member 21 is provided with means for retaining it on the wheel and more particularly for retaining it in clamped engagement against the tire rim. To this end, a trim ring type of retaining ring member 23 is provided which may be made from suitable sheet material such as stainless steel, brass or the like, susceptible of being finished as desired either by painting the same or by polishing and plating the same or a combination of such treatments. This retaining ring member 23 may be formed as a rolled section if desired.

For interengagement of the sidewall rubber-like ring member 21 and the metallic retaining ring member 23, a complementary formation of the inner margin of the ring member 21 and the ring member 23 is provided including an angular generally radially inwardly extending marginal flange portion 24 on the ring member 21 providing a thickened generally axially outwardly projecting rib at its radially inner juncture with a generally axially inwardly extending marginal flange portion 25 providing with the angular marginal flange portion 24 a generally radially outwardly and axially inwardly opening annular groove 27 arranged to seat upon the annular rounded shoulder 19 at juncture of the intermediate flange 17 and the terminal flange 18.

Engageable with the intermediate rib flange 24 is a generally radially outwardly extending outer marginal extremity flange 28 of the ring member 23 terminating in a preferably outwardly return-bent reinforcing bead and finishing flange 29. The construction and relationship is such that the flanges 28 and 29 together provide a generally rib-like axially inwardly projecting shoulder engageable within a generally axially outwardly opening annular groove at juncture of the sidewall ring member flange 24 with the body portion of the ring member which arches convexly generally radially and axially outwardly therefrom.

At juncture of the radially extending flange portion 28 with the main body portion of the ring member 23 which extends generally axially on a diameter for telescoping into spaced adjacent relation within the intermediate flange 17, an axially inwardly opening groove is provided within which the rib portion of the sidewall ring member flange 24 is interlockingly engaged in complementary relation. The cross-sectional shape and width of the body of the retaining ring member 23 is preferably such as to receive the continuous annular axially inwardly extending flange 25 of the sidewall ring member in complementary nested relation.

Interlocking of the inner margin of the flange 25 and the body of the ring member 23 is effected by means of retaining finger tabs 31 integral with the retaining ring member and clampingly engageable with the flange 25. In a desirable form, the tabs 31 are struck from the body of the ring member 23 with their base portions in the present instance integrally connected to a generally radially and axially inwardly angled annular inner marginal flange portion 32 on the ring member 23 adapted to extend into overlying relation to the outer side flange 15 of the tire rim and the adjacent portion of the wheel body 10, an underturned annular terminal flange 33 affording a finishing and reinforcing structure for the inner extremity of the flange 32.

The inner margin of the sidewall ring member flange 25 is engaged generally clampingly between the tabs 31 and the radially outer side of the body of the retaining ring member 23, with the immediately engaged portions of the flange 25 pressed radially inwardly to bulge slightly into sockets afforded herein by openings 34 provided in the striking out of the tabs 31, thus enhancing the gripping interlocking engagement of the flange 25 by the tabs 31.

Further enhancing the interlocking interengagement of the flange 25 by the tabs 31 is an interlocking relationship afforded between generally hook-like base portions of the tabs 31 with an annular thickened bead-like terminal 35 on the flange 25.

In addition, the retaining tabs 31 serve as retaining fingers for the ring assembly by the provision on the tabs 31 of generally radially and axially outwardly angled free end rim flange engaging terminals 37. These terminals normally extend to a slightly greater diameter than the opposing diameter of the axially outer portion of the intermediate flange 17 of the tire rim. Thereby when the ring assembly is applied to the outer side of the wheel with a valve stem 38 carried by the side flange 15 projecting through a valve stem aperture 39 in the ring flange 32, an axially inward pressure is applied to the retaining ring member 23, the retaining terminals 37 are caused to cammingly engage the intermediate flange 17 and progressively contract by resilient flexure of the tab fingers 31 until the ring assembly has been fully seatingly interengaged with the tire rim by full engagement of the groove portion 27 on the rim shoulder 19 and with the retaining ring hook-like interlock and clamping flange 28 clampingly thrusting the connecting neck between the flange 24 and the body of the sidewall ring member 21 within the groove 30 against the radially inner portion of the terminal flange 18 of the tire rim. In the fully engaged retained gripping relationship of the retaining finger terminals 37, there is an enhanced gripping clamping interlocking of the inner margin of the ring flange 25 with the retaining ring member 23 by the radially inward flexed thrusting of the finger tabs 31 in engagement with the flange 25. At the same time, the resilient backing of the more or less compressed rubber-like flange 25 reacts to afford a substantial resilient tensioning of the retaining tab fingers 31 to enhance gripping of the tips of the terminals 37 on the intermediate flange 17 of the tire rim.

Since the terminal flanges 37 are short and stiff, removal of the ring assembly can be readily effected by flexing the ring member 21 generally axially outwardly swingably about a fulcrum at the groove 30 thereof substantially as indicated in FIGURE 3 and then applying the tip of a pry-off tool P between the underlying portion of the tire rim terminal flange 18 and the portion of the ring member 21 behind the bead 29. Since the flanges 28 and 29 are substantially stiff and provide mutual reinforcement, action of the pry-off force will cause the tips of the retaining finger terminals 37 to be drawn axially outwardly along the intermediate flange 17 until the fingers are dislodged for thereby enabling removal of the ring assembly from the wheel. Replacement of the ring assembly may then be effected as desired on the same wheel or another wheel similarly as hereinabove described, with the ring member 21 swinging axially outwardly from its normal condition as shown in dash outline in FIGURE 2 into the full outline position as the attached, mounted relationship of the ring assembly on the wheel is attained.

The modification of FIGURE 5 is substantially the same as the structure shown in FIGURES 1–4 and similar reference numerals indicate identical parts. However, instead of the inner margin of the retaining ring member 23 extending only partially between the edge of the hub cap and the ring assembly, a marginal flange 38 is provided which extends in generally transversely dished form for underlying at its radially inner margin the retaining bead 13 of the tire rim. Through this arrangement, in the fully assembled relationship the ring member 23 and the hub cap 14 afford the appearance of a continuous cover that completely covers the outer side of the wheel and from the outer margin of which the sidewall ring member 21 emanates. In this particular arrangement, it is necessary to remove the hub cap 14 before the ring assembly can be removed from the wheel, and by the same token the hub cap serves as a safety lock for the ring assembly.

In the modification of FIGURES 6 and 7, details of the wheel are substantially the same as in FIGURE 2 and similar reference numerals identify identical parts. In this instance, however, the wheel body has marginal insets providing openings 40 at juncture with the base flange of the tire rim receptive of axially extending retaining fingers 41 having angled generally radially and axially outwardly extending retaining terminals 42 engageable with the tire rim base flange and by which a metallic retaining ring member 43 is secured in place on the wheel. There may be a series such as four of the retaining fingers 41 as shown in FIGURE 7. On its axially outer margin, the retaining ring member 43 is provided with a rib portion 44 affording a generally radially outwardly opening groove within which is received in interlocked relation an annular thick inner marginal rib 45 on a tire sidewall simulating extension ring member 47. On its inner side the rib 45 is provided with an annular groove 48 engageable in generally interlocking relation with the tire rim annular shoulder 19.

Between the rib 45 and the principal or body portion of the sidewall ring member 47 is provided an annular generally concave convex chamber grooved rib portion 49 for overlying the terminal flange 18 to provide a wheel balancing weight receiving chamber. At the radially outer side of the chamber rib 49 is an annular generally indented shoulder rib 50 which is adapted to engage the tip of the terminal flange 18 and thus while maintaining the principal portion of the inner surface of the ring member 47 spaced from the tire rim sidewall, nevertheless bringing the sidewall ring member rather closely adjacent to the tire sidewall for enhancing the general tire sidewall appearance of the ring member.

From the rib 50 the ring member 47 tapers toward a feather edge 51 which makes contact with the tire sidewall on the incurving portion thereof. It will be appreciated that the sidewall ring member 47 is fabricated from rubber-like material similarly as the sidewall ring member 21 and normally tends to assume a more axially inwardly deflected position than shown in FIGURE 6 with respect to the tire sidewall so as to remain in generally axially outwardly tensioned deflected position with respect to the tire sidewall and thus maintaining the feather edge 51 in firm hugging self-positioning engagement with the sidewall.

The sidewall ring assembly 43, 47 is especially desirable under circumstances where it is preferred to effect a substantially theft-resistant arrangement. Although the rubber-like ring member 47 is carried in assembly with the retaining ring member 43 by the interengagement of the inner marginal rib flange 45 of the ring member 47 within the channel portion 44, in a resiliently snapped-in relationship which will also enable snapping of the rib flange 45 out of the channel of the retaining groove rib 44, in the assembled relationship of the ring assembly with the wheel, removal is quite difficult. This is effected by the particular manner of interengagement of the retaining terminals 42 of the fingers 41 within the wheel opening wherein the terminals 42 extend substantially entirely across the wheel openings so that while the tips of the terminals engage bitingly with one of the flanges defining the openings, the bodies of the fingers 41 are backed up against the opposite flange defining the openings and with the fingers substantially concealed behind the inner margin of the ring member 43. As a result, the retaining terminals 42 are in a substantially wedged interengagement with the wheel thoroughly resisting withdrawal from the wheel openings since any outward pull on the ring assembly only makes the retaining fingers bite that much harder so that in order to remove the ring it is necessary to get into the inner side of the wheel and dislodge the retaining fingers by means of a screwdriver or other tool pressed against the axially inner sides of the retaining fingers to move the same radially away from the engaged flange of the wheel. Then, by the clamping of the inner marginal large size rib flange 45 to the tire rim by the ring member 43 which at its outer extremity is provided with an underturned substantially stiff generally axially inwardly directed clamping edge 52 fitting into a groove 53 at the radially outer side of the rib 45, a thoroughly interlocked retention of the ring member 47 is effected substantially precluding its being pulled free from the wheel. However, since the ring member 47 is of resiliently flexible, elastic material it can readily be flexed axially outwardly to expose the terminal flange 18 when it is desired to apply wheel balancing weights to the rim terminal flange within the chamber defined between the terminal flange and the channel rib 49 of the sidewall ring member.

It will be understood that modifications and variations may be effected without departing from the scope of the novel concepts of the present invention.

I claim as my invention:

1. In a wheel structure including a tire rim and a pneumatic tire supported thereby, a resiliently flexible tire sidewall simulating member engageable with the tire sidewall and having a portion thereof overlying and engaging the tire rim, and a circular retaining member of relatively rigid material including a clamping portion engaging and clamping the tire rim overlying portion of the sidewall ring member, said retaining member including a generally axially inwardly extending portion having cover retaining fingers struck therefrom and pressed generally radially outwardly opposite strike-out apertures and engaging the tire rim, with an inner marginal flange portion of the sidewall simulating ring member engaged by said fingers and pressed into said apertures for assisting in retaining the ring member and the retaining member assembled.

2. In a wheel structure including a tire rim and a pneumatic tire supported thereby, a resiliently flexible tire sidewall simulating member engageable with the tire sidewall and having a portion thereof overlying and engaging the tire rim, and a circular retaining member of relatively rigid material including a clamping portion engaging and clamping the tire rim overlying portion of the sidewall ring member, said retaining member including a generally axially inwardly extending portion having cover retaining fingers struck therefrom and pressed generally radially outwardly opposite strike-out apertures and engaging the tire rim, with an inner marginal flange portion of the sidewall simulating ring member engaged by said fingers and pressed into said apertures for assisting in retaining the ring member and the retaining member assembled, said fingers having, at juncture with the retaining member, hook-like portions and the ring member having a rib terminus interlockingly engaged in said hook-like portions.

3. In a wheel structure including a tire rim having a terminal flange with a radially extending portion and an axially outwardly extending portion and with a shoulder at juncture of the radially extending portion with an intermediate flange of the tire rim, a tire sidewall simulating ring member of a diameter to overlie the terminal flange and project substantially radially outwardly therebeyond for engagement with the sidewall of a tire, the radially inner portion of the ring having retaining engagement with the rim shoulder, and a retaining circular member including a turned edge clampingly engaging the ring member in the portion thereof adjacent the radially outer side of said shoulder and leaving the ring member clear radially outwardly therefrom so as to afford a clearance space over the radially extending and axially extending terminal flange portions for wheel balancing weights, said turned retaining edge including a generally out turned reinforcing flange structure affording a pry-off shoulder against which the underlying portion of the ring member is adapted to be urged by a pry-off tool inserted therebehind.

4. In a wheel structure including a tire rim and a wheel body supporting the same, with a pneumatic tire engageable in the tire rim and with its sidewall overhanging the terminal flange of the tire rim, a hub cap retainingly engageable over the wheel body spaced from juncture of the wheel body with the tire rim, a tire sidewall simulating ring member of a diameter to overlie the overhanging sidewall portion of the tire and having a radially inner portion engaging the tire rim, and a retaining ring member of relatively rigid material clampingly securing the sidewall simulating ring member against the tire rim and having intermediately thereof retaining fingers engageable grippingly with the tire rim and a radially inner marginal portion for concealingly overlying the juncture of the tire rim and the wheel body, said retaining fingers being struck from the body of the retaining ring member and having in retaining engagement therewith an inner marginal flange portion of the sidewall retaining ring member.

5. In a tire sidewall simulating ring assembly, a rubber-like resiliently flexible ring member, and a retaining circular substantially rigid member of sheet metal having retaining fingers thereon of generally hook form and with a marginal rib portion of said sidewall simulating ring member interengaged in the hook portions of the retaining fingers, said retaining fingers being struck from the retaining member and the retaining fingers coacting with the engaged portion of the flexible ring member to press the same into apertures from which the fingers are struck for assisting in interlocking the members together.

6. In a tire sidewall simulating ring assembly, a rubber-like resiliently flexible ring member, and a retaining circular substantially rigid member of sheet metal having retaining fingers thereon of generally hook form and with a marginal rib portion of said sidewall simulating ring member interengaged in the hook portions of the retaining fingers, said retaining fingers being struck from the retaining member and the retaining fingers coacting with the engaged portion of the ring member to press the same into apertures from which the fingers are struck for assisting in interlocking the members together, said members having interengaging rib and groove structure disposed in outwardly spaced relation to said retaining fingers and coacting therewith to maintain the members in unitary assembly for handling.

7. In a wheel structure including a tire rim and a pneumatic tire supported thereby, a tire sidewall simulating ring assembly including a resiliently flexible ring member having a radially outer edge portion for opposing the tire sidewall and a radially inner marginal portion for overlying the tire rim, a circular metallic retaining member having a portion thereof for clampingly engaging and pressing said inner marginal portion of the sidewall simulating ring member against the tire rim, and a plurality of resilient retaining fingers integral with and projecting from an intermediate portion of the retaining member clampingly engaging a portion of said inner marginal portion of the sidewall simulating ring member against an opposing portion of the retaining member, said fingers having terminal portions for retainingly gripping the tire rim and by such gripping being resiliently deflected into interlocking tensioned compression engagement of the finger-engaged portion of the tire sidewall simulating ring member margin.

8. In a wheel structure including a wheel body supporting a multi-flange tire rim for carrying a pneumatic tire having an outer sidewall, the rim having a generally radially inwardly facing and axially extending annular flange, a trim assembly for disposition at the outer side of the wheel, including:
   (a) a metallic circular member having a generally axially extending flange of smaller outside diameter than and telescopically disposable with respect to the radially inner face of said rim flange,
   (b) a ring member of rubber-like material including a generally axially extending annular flange telescopically disposed about said axially extending flange of the metallic member and of an outside diameter smaller than and opposing said radially inner face of the rim flange,
   (c) and a plurality of retaining fingers projecting from backed-up relation on said outside diameter of said resiliently tensionable annular flange radially outwardly and having terminal portions which normally project to a larger diameter than said radially inner face of the rim flange for thrusting into gripping engagement with said radially inner face and being thereby deflected radially inwardly whereby the backup afforded by said resiliently tensionable flange resiliently tensions the fingers and increases the gripping thrust of said terminal portions,
   (d) said flange of the metallic member having sockets therein opposite said fingers and into which sockets material of the resiliently tensionable flange between the fingers and the sockets is bulged by the tensioning of the fingers against said radially inner face whereby to resist relative separation of said members.

References Cited in the file of this patent

UNITED STATES PATENTS

| | | |
|---|---|---|
| 2,214,746 | Lyon | Sept. 17, 1940 |
| 2,308,615 | Lyon | Jan. 19, 1943 |
| 2,312,568 | Lyon | Mar. 2, 1943 |
| 2,757,972 | Lyon | Aug. 7, 1956 |
| 2,757,973 | Lyon | Aug. 7, 1956 |
| 2,901,292 | Wood | Aug. 25, 1959 |
| 2,937,903 | Wood | May 24, 1960 |
| 2,937,904 | Barnes | May 24, 1960 |
| 2,970,009 | Lyon | Jan. 31, 1961 |

FOREIGN PATENTS

| | | |
|---|---|---|
| 1,061,278 | France | Nov. 25, 1953 |
| 61,528 | France | Nov. 24, 1954 |

(First addition to 1,015,295)